United States Patent
Patil et al.

(10) Patent No.: US 10,754,834 B1
(45) Date of Patent: *Aug. 25, 2020

(54) SYSTEM AND METHOD FOR OPERATIONAL CONTINUITY OF BACKUP OPERATIONS TO A DEDUPLICATED STORAGE

(71) Applicant: Veritas Technologies LLC, Mountain View, CA (US)

(72) Inventors: Deepak Patil, Mountain View, CA (US); Graham Bromley, Mountain View, CA (US); Neel Bhatt, Mountain View, CA (US); Stephen Gipp, Mountain View, CA (US)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/918,922

(22) Filed: Jun. 15, 2013

(51) Int. Cl.
*G06F 16/176* (2019.01)
*G06F 16/435* (2019.01)
*G06F 16/182* (2019.01)
*G06F 16/215* (2019.01)

(52) U.S. Cl.
CPC .................................. *G06F 16/215* (2019.01)

(58) Field of Classification Search
CPC .. G06F 3/0641; G06F 11/1453; G06F 3/0608; G06F 3/061; G06F 3/067; G06F 17/30156; G06F 17/30162; G06F 3/0649; G06F 3/0685; G06F 11/1435; G06F 11/0709
See application file for complete search history.

(56) References Cited

U.S. PATENT DOCUMENTS

| | | | |
|---|---|---|---|
| 6,526,433 B1* | 2/2003 | Chang | G06F 11/0709 709/201 |
| 7,523,098 B2 | 4/2009 | Hirsch | |
| 8,145,843 B2 | 3/2012 | Srinivasan et al. | |
| 8,290,972 B1* | 10/2012 | Deshmukh et al. | 707/758 |
| 8,346,730 B2 | 1/2013 | Srinivasan et al. | |
| 8,949,561 B2 | 2/2015 | Vellore et al. | |
| 9,436,697 B1 | 9/2016 | Kulkarni et al. | |
| 2011/0087731 A1* | 4/2011 | Wong et al. | 709/204 |
| 2011/0125722 A1* | 5/2011 | Rao et al. | 707/693 |
| 2013/0246366 A1* | 9/2013 | Preslan | G06F 11/1453 707/652 |

(Continued)

OTHER PUBLICATIONS

U.S. Appl. No. 13/918,922, filed Jun. 15, 2013, System and Method for Operational Continuity of Backup Operations to a Deduplicated Storage, Deepak Patil.

(Continued)

*Primary Examiner* — James Trujillo
*Assistant Examiner* — Kurt A Mueller
(74) *Attorney, Agent, or Firm* — Patent Law Works LLP (57) ABSTRACT

A method and system for backing up data is provided. The method includes storing a first plurality of data units in a backup storage, as a result of a fingerprint database being available, the first plurality of data units being deduplicated through application of the fingerprint database. The method includes storing a second plurality of data units in the backup storage, as a result of the fingerprint database being unavailable, wherein at least one step of the method is executed through a processor.

16 Claims, 4 Drawing Sheets

(56) References Cited

U.S. PATENT DOCUMENTS

2014/0281216 A1* 9/2014 Danilak ....................... 711/113

OTHER PUBLICATIONS

U.S. Appl. No. 13/918,923, filed Jun. 15, 2013, System and Method to Enable Deduplication Engine to Sustain Operational Continuity, Deepak Patil.
U.S. Appl. No. 13/919,038, filed Jun. 17, 2013, Preferential Retention of High-Value Fingerprints in a Deduplication System, Graham Bromley.

* cited by examiner

| FINGERPRINT IDENTIFIER | FINGERPRINT | STORAGE IDENTIFIER | DATA UNIT IDENTIFIER |
|---|---|---|---|
| 1 | ... 00110 | DISK 5 | ... 99 |
| 2 | ... 10010 | DISK 2 | ... 07 |
| ... | | | |
| N | ... 01011 | DISK 4 | ... 12 |

FIG. 4

SYSTEM AND METHOD FOR OPERATIONAL CONTINUITY OF BACKUP OPERATIONS TO A DEDUPLICATED STORAGE

CROSS REFERENCE TO RELATED APPLICATION

This application is related to U.S. application Ser. No. 13/918,923 entitled "System and Method to Enable Deduplication Engine to Sustain Operational Continuity," which is incorporated herein by reference for all purposes.

BACKGROUND

Large amounts of documents, files and other forms of data are being produced and managed on computer systems worldwide, every day. Backup systems, backup storage and backup algorithms are in use in many of these computer systems, at consumer, commercial and institutional levels. Backups allow recovery from crashes, in which data would otherwise be lost were it not for the existence of backup copies of the data. Data deduplication improves efficiency of many aspects of backing up, by eliminating redundant copies of data in the backup storage. Storage efficiency is thus improved, as space that would be occupied by redundant copies of the data can be used for storing additional data. In addition, backup time is reduced as the time that would have been spent storing redundant copies of the data is eliminated. Data deduplication can be performed as a post-processing operation to eliminating redundant copies through selective deletion after the data is stored or in the alternative data deduplication can be performed prior to storage.

Whether performed as a pre-processing or post-processing operation, many if not most deduplication systems and algorithms make use of fingerprints of data units. These fingerprints allow comparison with a newly generated fingerprint of a newly arriving data unit. The fingerprint comparison proceeds much more quickly than one-to-one comparison of the data units themselves. However, corruption in a fingerprint database or disruption of communication between a processor and a fingerprint database can cause a backup system to malfunction and even become inoperable. An incomplete backup can leave a computer system vulnerable to irrecoverable failure.

It is within this context that the embodiments arise.

SUMMARY

In some embodiments, a method for backing up data is provided. The method includes storing a first plurality of data units in a backup storage, as a result of a fingerprint database being available, the first plurality of data units being deduplicated through application of the fingerprint database. The method includes storing a second plurality of data units in the backup storage, as a result of the fingerprint database being unavailable, wherein at least one step of the method is executed through a processor.

In some embodiments, a non-transient, tangible, computer-readable media having instructions thereupon is provided. The computer readable media, when executed by a processor, causes the processor to derive a first plurality of deduplicated data units from a first plurality of data units and a fingerprint database, as a result of the fingerprint database being accessible. The processor when executing the instructions stores the first plurality of deduplicated data units in a backup storage memory and stores a second plurality of data units in the backup storage memory, as a result of the fingerprint database being inaccessible.

In some embodiments, a data backup system is provided. The data backup system includes a memory storing a fingerprint database, a backup storage, and a deduplicating backup module coupled to the backup storage. The deduplicating backup module is configured to couple to the memory and configured to compare a fingerprint of a data unit to existing fingerprints in the fingerprint database, with access to the fingerprint database being available. The deduplicating backup module is configured to store the data unit in the backup storage, in response to an indication of no match of the fingerprint to the existing fingerprints in the fingerprint database and to store, in the fingerprint database, an entry linking the data unit to a data set from which the data unit originates, in response to an indication of a match of the fingerprint to one of the existing fingerprints in the fingerprint database. The deduplicating backup module is configured to store the data unit in the backup storage, in response to the access to the fingerprint database being unavailable during an attempt to compare the fingerprint to the existing fingerprints in the fingerprint database.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A data backup system and related method perform data deduplication while a fingerprint database is available. Deduplicated data is stored in backup storage. If the fingerprint database becomes unavailable during a backup run or backup session, the system and method continue to store data in the backup storage. Thus, data is backed up whether or not the fingerprint database is available. The fingerprint database can become unavailable for a variety of reasons, as discussed further below. This data backup system and related method allow a backup to be completed under circumstances where the fingerprint database is reliably available, intermittently unavailable, intermittently available, or constantly unavailable.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
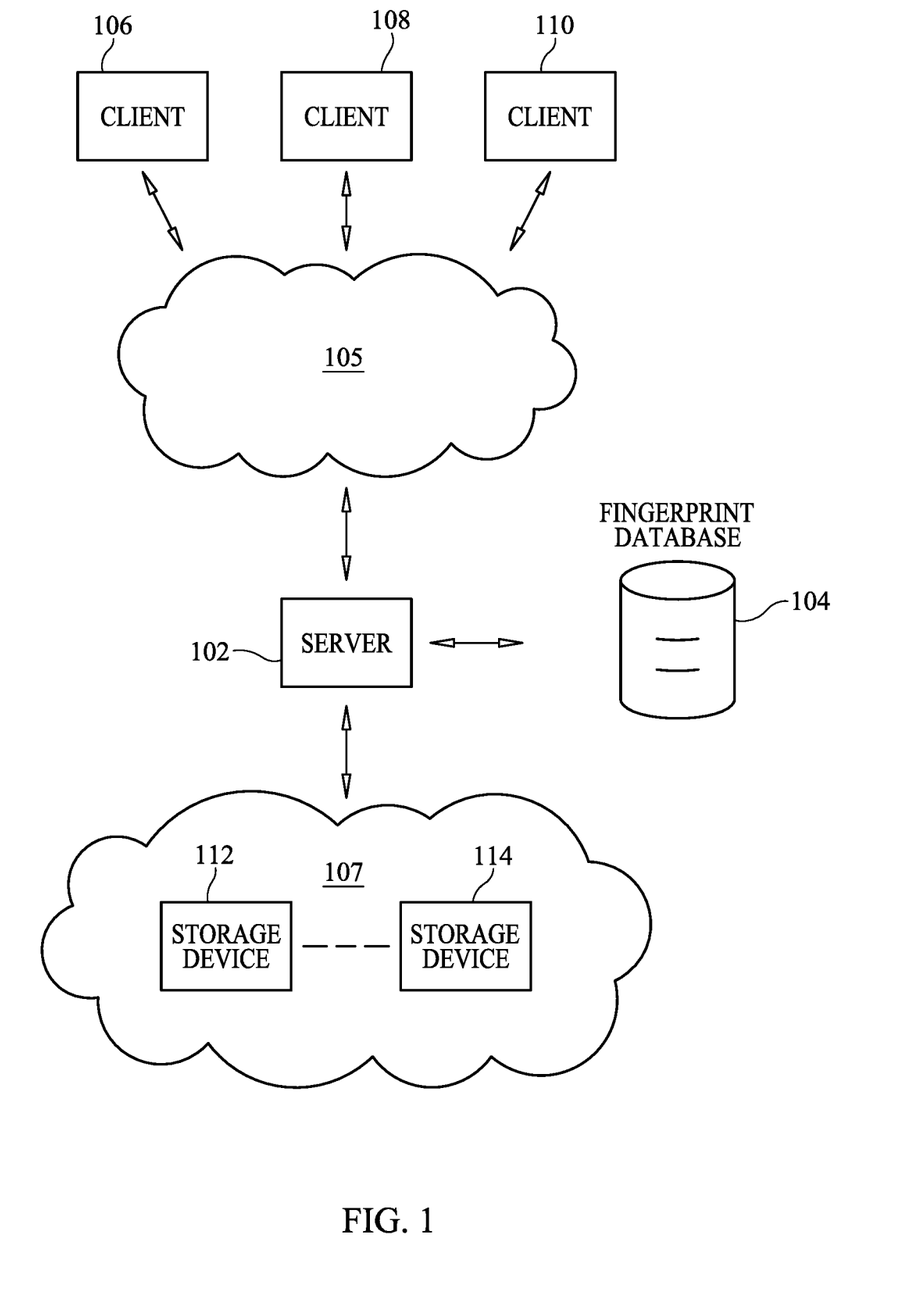
FIG. 1 is a schematic diagram of a data backup system, which uses a fingerprint database during data deduplication.

FIG. 1 shows a server 102 that performs backups for any or all of the clients 106, 108, 110. Backup data is stored in one or more of the storage devices 112, 114. In order to perform data deduplication, the server 102 accesses a fingerprint database 104 through a network connection. In the example shown, the clients 106, 108, 110 are coupled to the server 102 via a network 105, and the server 102 is coupled to the storage devices 112, 114 via another network 107. In some embodiments network 107 may be a storage area network or network attached storage. The server 102 could be coupled to the fingerprint database 104, i.e., coupled to a memory in which the fingerprint database is stored, in any of a variety of ways. Coupling could be via a network, through a local coupling, or through an internal coupling. One example of an internal coupling is where the fingerprint database is stored on a memory internal to the server 102. The above-described networks could be combined, or further networks could be used, etc. The fingerprint database 104 could be provided as a web service or a cloud service in some embodiments. Other arrangements and couplings for the server 102, the clients 106, 108, 110, the fingerprint database 104, and the storage devices 112, 114 are readily devised.

When performing a backup with deduplication, the server 102 checks the fingerprint database 104. Data that has been previously handled by the server 102 and stored in one of the storage devices 112, 114 already has a fingerprint in the fingerprint database 104. For newly arriving data that is to be backed up, the server obtains or generates a fingerprint of the newly arriving data. The fingerprint could accompany the data, the server could generate the fingerprint, or the server could obtain the fingerprint from another device or service. The algorithm for generating the fingerprint may be any known algorithm commonly utilized for fingerprint generation. This fingerprint is then compared with fingerprints in the fingerprint database 104. The comparison could be performed by the server, or could be performed on a query basis with another server that handles the fingerprint database. If no match is found, the server sends the data onward to one or more of the storage devices 112, 114, and the data is stored in that backup storage, i.e., the server 102 stores the data in the storage devices 112, 114. The server 102 writes the fingerprint to the fingerprint database 104, shortly before, while, or shortly after the data is sent to the storage devices 112, 114. It should be appreciated that if a match is found, the data is not sent onward to the storage devices 112, 114, as doing so would be storing redundant data. In this manner, the data is deduplicated prior to storage in a backup storage.

Figure 2:
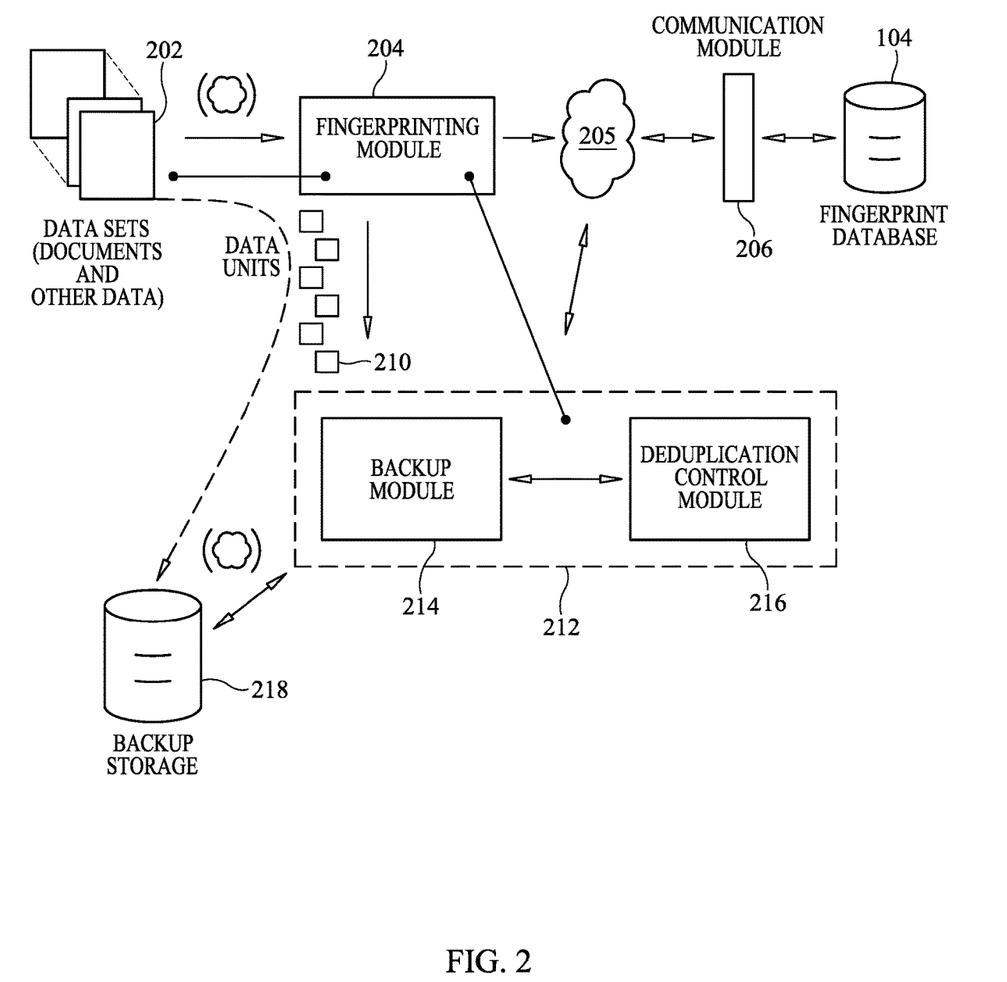
FIG. 2 is a schematic diagram of a data backup system, with details regarding data sets, data units, fingerprinting and deduplication.

FIG. 2 shows an embodiment of the data backup system, in more detail than FIG. 1. The data backup system of FIG. 2 performs backup with deduplication while the fingerprint database 104 is available or accessible, and continues performing backup even when the fingerprint database 104 becomes unavailable or inaccessible during the same backup run or backup session. As shown by the dashed-line arrow, the data backup system stores selected data units 210, from data sets 202, in backup storage 218. The system accesses the data sets 202 in any of a variety of ways. For example, the data sets 202 could be accessed by a network, shown in FIG. 2 as a cloud in parentheses (to indicate various types of access connections are possible in various embodiments), or the data sets 202 could be accessed via a local connection, an internal connection or other connections as readily devised.

Still referring to FIG. 2, a fingerprinting module 204 segments or decomposes the data sets 202 into data units 210. In some embodiments, the data sets 202 are provided as previously broken up or segmented into data units 210. For example, a data set could include one or more files, documents or other types of data, of which the data units 210 are a subset. As a further example, a document could be broken up or decomposed into paragraphs or other units of smaller granularity than the entire file or document. The paragraphs or other units would then be the data units 210. Alternatively, the data units 210 could be the same size as the files, documents or other types of data. It is possible that data units 210 could be groups of files, documents or other types of data. The size of the data unit 210 and the definition of the data unit 210 may be implementation dependent. It should be appreciated that a data unit could be one or more files or documents, or smaller than the file size or document size. In some embodiments a data unit could be a fixed size block or a variable sized block.

Continuing with FIG. 2, for each data unit 210, the fingerprinting module 204 derives or generates a fingerprint. The fingerprinting module 204 makes the fingerprint available to the fingerprint database 104 and/or to a deduplicating backup module 212. The fingerprinting module 204 may apply a known fingerprinting algorithm or may use a proprietary fingerprinting algorithm. A fingerprinting algorithm maps a larger chunk of data to a smaller piece of data, such as a string in some embodiments. The smaller piece of data is the fingerprint, or is part of the fingerprint, for the larger chunk of data, and serves with high probability to uniquely identify the larger chunk of data. For example, a hashing algorithm, a cryptographic algorithm or a cryptographic-grade hashing algorithm could be used in the fingerprinting module 204 to derive or generate a fingerprint.

The fingerprinting module 204 of FIG. 2 is in various locations in various embodiments of the system. Some of these membership possibilities are shown in FIG. 2 as lines with dots at both ends, indicating the fingerprinting module 204 could belong to or be integrated with a member at the location of the dot. In one embodiment, the fingerprinting module 204 is included in a source of the data sets 202. In another embodiment, the fingerprinting module 204 is included in a source of the data units 210. In these embodiments, the data units 210 are provided along with fingerprints. For example, the backup system could receive data sets 202 that are previously broken up into data units 210, and a fingerprint could accompany each data unit 210. In one embodiment, the fingerprinting module 204 is accessible through a network connection and is provided on a host, which differs from the host that provides the deduplicating backup module 212. In yet another embodiment, the fingerprinting module 204 is included in the deduplicating backup module 212. For example, one or more modules could be implemented using one or more specially programmed processors, in a standalone computer, in a server, in a group of computers or servers, and so on. These could be local or combined, or distributed, or connected via one or more networks.

The deduplicating backup module 212 in FIG. 2 performs backups by storing selected data units 210 in a backup storage 218. The selection process, by which the data units 210 are selected for storage, depends on whether or not the fingerprint database 104 is available for use in deduplication. The backup storage 218 can include one or more hard drives, one or more readable/writable optical discs, or other types of storage memory. In one embodiment, the backup storage 218 is accessed via a local connection. In another embodiment, the backup storage 218 is accessed via a network, shown as a cloud in parentheses. Other types of access and connections or couplings are readily devised.

As shown in FIG. 2, the deduplicating backup module 212 includes a backup module 214 and a deduplication control module 216. In another embodiment, the deduplicating backup module 212 is an integrated unit which performs the functions of both the backup module 214 and the deduplication control module 216. The backup module 214 performs the functions of backing up the data units 210. These functions include storing or directing the storage of the selected data units 210 in the backup storage 218. The deduplication control module 216 performs the deduplication functions. These functions include directing the selection of which ones of the data units 210 should be sent on to storage in the backup storage 218. The deduplication control module 216 directs the backup module 214 as to whether or not a backup of a data unit includes deduplication. The backup module 214 can then store deduplicated data units 210 or non-deduplicated data units 210 in the backup storage 218, as directed by the deduplication control module 216.

Still referring to FIG. 2, a communication module 206 provides and controls access to the fingerprint database 104, for example via a network 205. In further embodiments, the fingerprint database 104 is accessed via other types of modules, buses, networks or connections. In some embodiments, the fingerprint database 104 would be accessible or available to the deduplicating backup module 212 with 100% reliability. However, in real-world applications, a variety of failures can occur, especially for hosted applications and/or web services. The communication module 206 could experience a hardware or software failure and crash, a network could go down, a communication channel could be closed or malfunctioning, a website hosting the fingerprint database could be down, some other connection to the fingerprint database could be down, the fingerprint database could be off-line for maintenance or as a result of failure, and so on. In embodiments where coupling to the fingerprint database 104 is via a network connection, unavailability of the fingerprint database 104 could be indicated by an error message such as "host not found" or "error:" accompanied by some error code number. In another embodiment, where the fingerprint database is internal to the system and access is based upon a request, an internal access to the fingerprint database might not be granted for various reasons. Alternatively, the fingerprint database could be corrupted, perhaps as a result of a software bug or hacking. Because of these or other possible situations, in the real world the fingerprint database is likely to be less than 100% reliable and will likely be unavailable or inaccessible some of the time. Similar factors affect many complex electronic systems, especially enterprise databases, distributed systems and networked systems. The deduplicating backup module 212 described herein is designed with fault tolerance so as to continue operating whether or not the fingerprint database 104 is available as detailed further below.

For each arriving data unit 210, the deduplicating backup module 212 compares the fingerprint of the data unit 210 to existing fingerprints in the fingerprint database 104 and determines whether the fingerprint has a match in the fingerprint database. The deduplicating backup module 212 can do this when the fingerprint database 104 is available or accessible. For example, the deduplication control module 216 could receive the fingerprint from the fingerprinting module 204, and send the fingerprint to the communication module 206 along with a query to ask if the fingerprint has a match in the fingerprint database 104. In the alternative, the fingerprinting module 204 could send the fingerprint directly to the communication module 206, which would then send an indication of a match or no match to the deduplication control module 216. The fingerprinting module 204 may request a range of fingerprints be returned from the communication module 206, and perform a comparison check directly in some embodiments. Other techniques for the deduplication control module 216 or the deduplicating backup module 212 to perform the determination or the comparison are readily devised. A match is found if the fingerprint matches one of the existing fingerprints in the fingerprint database. If there is no match of the fingerprint to the existing fingerprints in the fingerprint database, the deduplication control module 216 directs the backup module to send the selected data unit 210 onward to the backup storage 218. The data unit 210 is then stored in the backup storage 218y.

If there is a match of the fingerprint to one of the existing fingerprints in the fingerprint database, the deduplication control module 216 does not direct the backup module to send the data unit 210 to the backup storage 218. In some embodiments, the deduplication control module 216 directs the backup module to not send the data unit 210 to the backup storage 218. In this situation, where there is a match, the data unit 210 is not stored in the backup storage 218 as a backup copy, because a previous copy of the data unit 210 is already stored in the backup storage 218. This previous copy of the data unit 210 is indicated by the existence of the matching fingerprint in the fingerprint database 104, where the existing fingerprint was stored into the fingerprint database 104 from a previous storage event. In response to the indication of the match of the fingerprint to the fingerprint database, the deduplication control module 216 stores an entry in the fingerprint database 104. In a further embodiment, this entry is stored in another database or another memory. This entry, wherever stored, is linked to the matching fingerprint in the fingerprint database 104, and links the data unit to a data set from which the data unit originates. The entry can be used if data is restored from backup storage 218 to a system, for example after such a system experiences a system crash or memory crash. The entry is used when a copy of the original data set is reassembled from backup-stored data units 210, as pointed to by fingerprints and entries made by the deduplication control module 216.

If the deduplication control module 216 attempts to compare a fingerprint of an arriving data unit 210 to existing fingerprints in the fingerprint database, and finds the fingerprint database 104 is unavailable, operation nonetheless continues. The deduplication control module 216 then directs the backup module 214 to send the data unit 210 onward to the backup storage 218, to store the data unit 210. Under circumstances where the fingerprint database 104 is unavailable, the backup module 214 can then store non-deduplicated data units 210. In various embodiments, the deduplication control module 216 could make a single attempt to communicate with the fingerprint database 104, or could make multiple attempts. In some embodiments, the deduplication control module 216 retries the communication or comparison attempt until a predetermined number of retries has occurred. In another embodiment, the deduplication control module retries the communication or comparison attempt until a predetermined timeout interval has occurred. The predetermined number of retries or the timeout interval could be implementation dependent or user-specified. If, during the retry attempts, the fingerprint database 104 becomes available, i.e., access to the fingerprint database becomes operational, the deduplication control module 216 can then direct storage of deduplicated data units 210 as described above. A background or foreground process could be employed to deduplicate data units 210 that were stored while the fingerprint database 104 was unavailable, or such data units 210 could remain as is, in various embodiments. If, during the retry attempts, the fingerprint database 104 remains unavailable, i.e., access to the fingerprint database is nonoperational, the deduplication control module 216 can then direct storage of non-deduplicated data units 210 as described above. In one embodiment, a retry is based upon an error message. For example, if one type of error message is received, indicating unavailability of the fingerprint database 104, retry is attempted immediately. If another type of error message is received, retry is attempted after a period of time. If yet another type of error message is received, a predetermined number of retries are attempted in succession or retries are attempted for a time. If one type of error message is received, no retry is attempted. In this manner, a backup operation can be of entirely deduplicated data units with application of a reliably available fingerprint database, of entirely non-deduplicated data units as a result of an unavailable fingerprint database, or of mixed deduplicated and non-deduplicated data units as a result of an intermittently available fingerprint database.

Continuing with FIG. 2, the deduplicating backup module 212 can operate in a pipelining or batch mode in some embodiments. For example, in one embodiment, the deduplication control module 216 pipelines the fingerprint match requests to the fingerprint database 104 and the backup module 214 pipelines the selection and storage of data units 210. As indications of match or no match return from the fingerprint database 104, the deduplication control module 216 directs the backup module 214 to include or not include a specified data unit 210 in the pipeline of data units 210 to the backup storage 218. Specifically, a data unit 210 which is not going to be stored in the backup storage 218 could be removed from a pipeline of data units 210, or not inserted into the pipeline. In another embodiment, the data units 210 could be readied for a batch write to the backup storage 218, before, while or after the deduplication control module 216 prepares and sends a batch of fingerprints or directs the fingerprinting module 204 to send a batch of fingerprints for matching to the fingerprint database 104. Alternatively, the deduplication control module 216 could request a batch of fingerprints from the fingerprint database 104, and the deduplication control module 216 could perform a local comparison with a batch of recently arrived fingerprints. In yet another embodiment, a plurality of deduplicated data units is derived from a plurality of data units 210, as a result of the fingerprint database 104 being accessible. These deduplicated data units include only the data units 210 that lack a match in the fingerprint database. This could be accomplished using pipelining or batch modes or other suitable modes. In some embodiments, the backup module 214 applies compression to data units 210. The compression could be applied after the data units 210 are deduplicated, and before the data units 210 are stored in the backup storage. This may be more efficient than applying compression before data units 210 are deduplicated or after data units 210 are stored in the backup storage, although such could be done in further embodiments. In another embodiment, compression is applied to data units 210 even when the fingerprint database 104 is unavailable.

Figure 3:
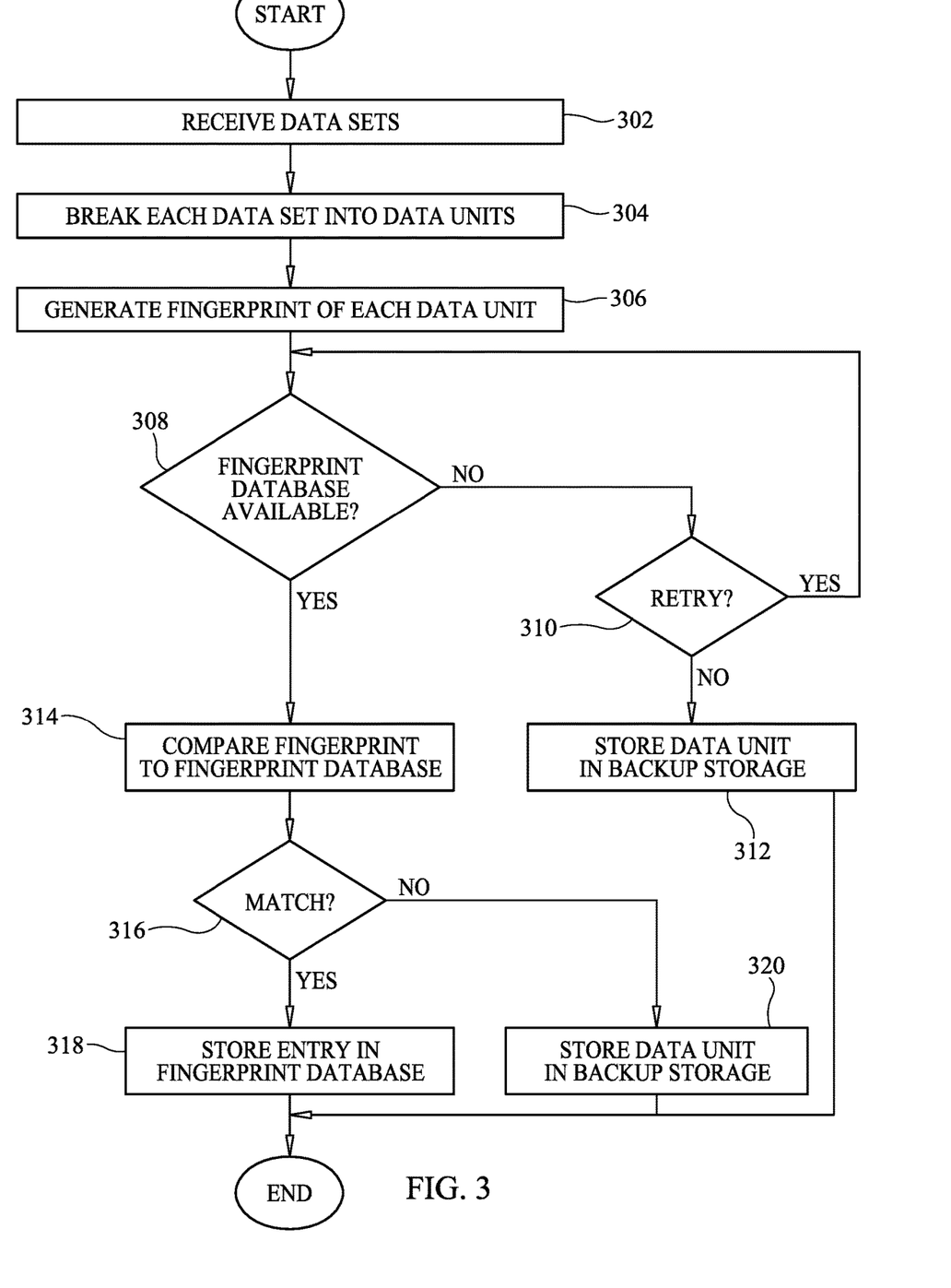
FIG. 3 is a flow diagram of a method of backing up data, which can be practiced on the data backup systems of FIG. 1 and FIG. 2.

FIG. 3 illustrates a flowchart of one embodiment of a method of backing up data. The method can be implemented using a specially programmed processor or computing device, and can be practiced on the data backup systems of FIGS. 1 and 2 in some embodiments. It should be appreciated that the method can be practiced in a single pass, or in a loop. The method supports deduplication and backup when a fingerprint database is available or unavailable, so that a backup operation or run can be performed to completion, once initiated, under conditions of reliable or unreliable access to the fingerprint database. The method initiates with operation 302, where data sets are received. The data sets can be received by a server, from a client as shown in FIG. 1 or the data sets can be received by the fingerprinting module or by the deduplicating backup module of FIG. 2 in some embodiments. Each data set is broken into data units, in an action 304. Segmenting each data set can be accomplished by the fingerprinting module or the data sets could be provided with the data units already segmented.

A fingerprint of each data unit is generated, in an action 306. The fingerprinting module, executing a fingerprinting algorithm, can perform action 306. Once the fingerprint is obtained, a decision action 308 determines whether a fingerprint database is available. The deduplication control module can execute this functionality in some embodiments. If it is determined the fingerprint database is not available, the method advances to decision operation 310 in order to determine if a retry should be performed. The deduplication control module can execute this functionality in some embodiments. If a retry should be performed, the flow branches and returns and repeats decision action 308. Each time through the retry decision action 310, a counter could be incremented or a timer checked, to see if a predetermined number of retries or a predetermined timeout interval has completed. Once the number of retries or the predetermined timeout interval has completed, it is determined that no further retries are to be performed. It should be appreciated that the embodiments may be set up so that there are no retries. Other conditions could be tested in a determination of whether or not there should be a retry. If it is determined that there should not be a retry in operation 310, the flow branches to the action 312, in which a data unit is stored in backup storage. The backup module can send the data unit to the backup storage, as shown in FIG. 2. After this action 312, the flow has an endpoint, or the flow could loop back to the start to receive more data sets or loop back to the action 306 to generate another fingerprint for another data unit.

Picking up again where the method flow was at the decision action 308 in FIG. 3, if it is determined that a fingerprint database is available, the flow branches to action 314. In action 314, the fingerprint is compared to the fingerprint database. The deduplication control module can perform action 314 by sending a query to the fingerprint database and receiving a reply, or by performing a comparison locally, e.g., in the deduplicating backup module. In a decision action 316, it is determined if there is a match between the fingerprint and a fingerprint of the fingerprint database. The determination may be executed by the deduplication control module finding that there is or is not a match between the fingerprint and one of the fingerprints in the fingerprint database in some embodiments.

If there is no match in decision action 316, the flow branches to the action 320. In the action 320, the data unit is stored in backup storage. The deduplication control module can direct the backup module to send the data unit for storage into the backup storage module. The deduplication control module can direct the fingerprinting module to send the fingerprint to the fingerprint database, or the fingerprinting module can initiate such action. After the data unit is stored, the flow has an endpoint, or the flow could loop back to the start to receive more data sets or loop back to the action 306 to generate another fingerprint for another data unit. If there is a match in decision action 316, then the flow branches to the action 318. In the action 318, an entry is stored in the fingerprint database. The deduplication control module can direct the fingerprint database to store the entry. The entry links the matching fingerprint, the data unit from which the fingerprint is derived, and the data set from which the data unit originates. After the entry is stored, the flow has an endpoint, or the flow could loop back to the start to receive more data sets or loop back to the action 306 to generate another fingerprint for another data unit.

Figure 4:
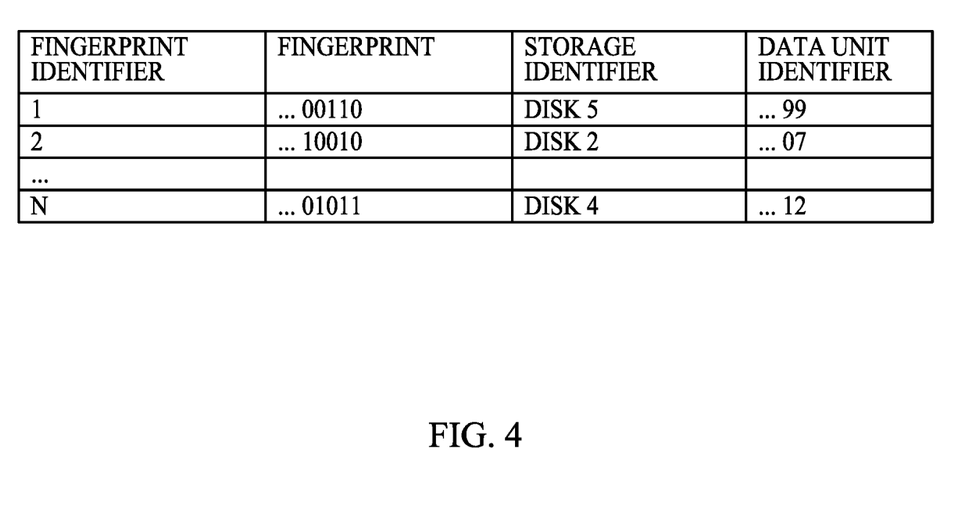
FIG. 4 is an example of a fingerprint table, which can be used in the systems of FIGS. 1-2 and the method of FIG. 3.

FIG. 4 shows a fingerprint table according to some embodiments. Embodiments of the data backup system and embodiments of the method of backing up data can use the fingerprint table or a variation, as described in the following examples. The fingerprint database 104 of FIGS. 1-2 can store a fingerprint table, such as the table of FIG. 4. For each newly arriving fingerprint that does not have a match in the fingerprint database, an entry is made in the fingerprint table. The fingerprint is assigned a fingerprint identifier, e.g. a binary, decimal, hexadecimal or other number or alphanumeric identifier, although other systems can be used to assign identifiers. The fingerprint is written into the table, e.g., as a binary number (shown in FIG. 4 with ellipsis to indicate additional bits), an alphanumeric string, a hexadecimal number, etc. The data unit corresponding to the fingerprint is either assigned a data unit identifier or arrives with an identifier (ellipsis indicates additional digits), and this data unit identifier is also written into the table as associated with the fingerprint. A storage device, e.g., a disk in the backup storage, is identified for storage of the data unit, and the storage identifier of the storage device is written into the fingerprint table. With such a fingerprint table or other searchable data structure, a data unit identified by a fingerprint can be retrieved for restoring data in a system that has experienced a crash. Newly arriving fingerprints can be checked for a match in the fingerprint table. Other types of fingerprint tables or data structures for storing fingerprints in the fingerprint database are readily devised. It should be appreciated that additional data and tables or other structures to support such data can be added to the fingerprint database. It should be further appreciated that fingerprints could be overwritten when the maximum capacity of the fingerprint table is reached in some embodiments.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for backing up data, comprising:
monitoring, during a backup operation, an availability of a fingerprint database required for deduplication;
segmenting a data set to be backed up in a backup operation into a plurality of data units and backing up the plurality of data units in a sequence until the data set is backed up to completion;
for each of the plurality of data units backed up in the sequence, making a deduplication and storage decision for each data unit based on the monitored availability or unavailability of the fingerprint database:
storing, in response to detecting the fingerprint database being available a plurality of data units in a backup storage that is deduplicated through application of the fingerprint database; and
storing, in response to detecting the fingerprint database being unavailable, a plurality of data units that are non-deduplicated in the backup storage;
wherein a first mode of operation is supported in which, in response to the fingerprint database being available during the entire backup operation, the backup operation utilizes a deduplicated first plurality of data units;
wherein a second mode of operation is supported in which, in response to the fingerprint database being unavailable during the entire backup operation, the backup operation utilizes a non-deduplicated second plurality of data units; and
wherein a third mode of operation is supported in which, in response to there being intermittent availability of the fingerprint database during the backup operation, the backup operation utilizes a mixture of deduplicated data units and non-deduplicated data units during different intervals of the backup operation.

2. The method of claim 1, wherein the first plurality of data units being deduplicated through application of the fingerprint database includes:
generating a fingerprint for each data unit of the first plurality of data units; and
storing the data unit in the backup storage responsive to failing to identify a match of the fingerprint to any fingerprint in the fingerprint database, for each data unit of the first plurality of data units.

3. The method of claim 1, wherein the fingerprint database being unavailable includes at least one condition being present from a set consisting of:
a network is down;
a website is down;
a connection to the fingerprint database is down;
a communication channel to the fingerprint database is malfunctioning;
a communication module is crashed;
an internal access to the fingerprint database is not granted;
the fingerprint database is off-line; and
the fingerprint database is corrupted.

4. The method of claim 1, further comprising:
retrying an access to the fingerprint database responsive to an initial unsuccessful attempt to access the fingerprint database; wherein:
the fingerprint database being available includes the access to the fingerprint database being operational during the retrying; and
the fingerprint database being unavailable includes the access to the fingerprint database being nonoperational during the retrying.

5. The method of claim 1, further comprising:
applying compression to the first plurality of data units after the first plurality of data units is deduplicated.

6. The method of claim 1, wherein the second plurality of data units is stored without comparison to fingerprints.

7. The method of claim 1, wherein storing the second plurality of data units is during a same backup run as storing the first plurality of data units.

8. A non-transient, tangible, computer-readable media having instructions thereupon which, when executed by a processor, cause the processor to:
monitor, during a backup operation, an availability of a fingerprint database required for deduplication;
segment a data set to be backed up in a backup operation into a plurality of data units and back up the plurality of data units in a sequence until the data set is backed up to completion;
for each of the plurality of data units backed up in the sequence, make a deduplication and storage decision for each data unit based on the monitored availability or unavailability of the fingerprint database:
store, in response to detecting the fingerprint database being available, a plurality of data units in a backup storage that is deduplicated through application of the fingerprint database; and
store, in response to detecting the fingerprint database being unavailable a plurality of data units that are non-deduplicated in the backup storage;
wherein a first mode of operation is supported in which, in response to the fingerprint database being available during the entire backup operation, the backup operation utilizes a deduplicated first plurality of data units;
wherein a second mode of operation is supported in which, in response to the fingerprint database being unavailable during the entire backup operation, the backup operation utilizes a non-deduplicated second plurality of data units; and
wherein a third mode of operation is supported in which, in response to there being intermittent availability of the fingerprint database during the backup operation, the backup operation utilizes a mixture of deduplicated data units and non-deduplicated data units during different intervals of the backup operation.

9. A data backup system, comprising:
a memory having a fingerprint database therein;
a backup storage; and
a deduplicating backup module coupled to the backup storage, the deduplicating backup module configured to couple to the memory and configured during a backup operation to:
monitor, during a backup operation, an availability of a fingerprint database required for deduplication;
segment a data set to be backed up in a backup operation into a plurality of data units and back up the plurality of data units in a sequence until the data set is backed up to completion;
for each of the plurality of data units backed up in the sequence, make a deduplication and storage decision for each data unit based on the monitored availability or unavailability of the fingerprint database:

compare a fingerprint of a data unit to existing fingerprints in the fingerprint database, with access to the fingerprint database being available;

store the data unit without deduplication in the backup storage, in response to an indication of no match of the fingerprint to the existing fingerprints in the fingerprint database;

store, in the fingerprint database, an entry linking the data unit to a data set from which the data unit originates, in response to an indication of a match of the fingerprint to one of the existing fingerprints in the fingerprint database; and store the data unit, without deduplication and without comparison of the fingerprint to the existing fingerprints in the fingerprint database, in the backup storage for the duration of the unavailable fingerprint database, responsive to access to the fingerprint database being unavailable during an attempt to compare the fingerprint to the existing fingerprints in the fingerprint database available;

wherein a first mode of operation is supported in which, in response to the fingerprint database being available during the entire backup operation, the backup operation utilizes the deduplicated first plurality of data units;

wherein a second mode of operation is supported in which, in response to the fingerprint database being unavailable during the entire backup operation, the backup operation utilizes the non-deduplicated second plurality of data units; and wherein a third mode of operation is supported in which, in response to there being intermittent availability of the fingerprint database during the backup operation, the backup operation utilizes a mixture of the deduplicated first plurality of data units and the non-deduplicated second plurality of data units during different intervals of the backup operation.

10. The data backup system of claim 9, wherein the entry is linked to the one of the existing fingerprints in the fingerprint database.

11. The data backup system of claim 9, wherein the deduplicating backup module includes:
a backup module configured to perform backups of data units; and
a deduplication control module configured to direct the backup module as to whether a backup of a data unit includes deduplication.

12. The data backup system of claim 9, wherein the deduplicating backup module is further configured to compress at least one data unit.

13. The data backup system of claim 9, further comprising a fingerprinting module configured to:
segment a data set into a plurality of data units; and
derive a fingerprint for each data unit of the plurality of data units.

14. The data backup system of claim 13, wherein the data unit in the backup storage bypasses a deduplication process prior to storing the data in the backup storage when the access to the fingerprint database is unavailable.

15. The data backup system of claim 13, wherein the fingerprinting module is included in the deduplicating backup module.

16. The data backup system of claim 13, wherein the fingerprinting module is included in a source of data units or a source of data sets.

* * * * *